(No Model.) 2 Sheets—Sheet 1.

S. EVERSHED.
INSTRUMENT FOR MEASUREMENT OF ELECTRIC RESISTANCES.

No. 563,917. Patented July 14, 1896.

Witnesses
H. van Oldenneel
Otto Munk

Inventor
Sydney Evershed
by Alexander R
Attorneys

UNITED STATES PATENT OFFICE.

SYDNEY EVERSHED, OF LONDON, ENGLAND.

INSTRUMENT FOR MEASUREMENT OF ELECTRIC RESISTANCES.

SPECIFICATION forming part of Letters Patent No. 563,917, dated July 14, 1896.

Application filed February 6, 1896. Serial No. 578,233. (No model.) Patented in England June 6, 1894, No. 10,978.

*To all whom it may concern:*

Be it known that I, SYDNEY EVERSHED, residing at London, England, have invented Improvements in Instruments for the Measurement of Electric Resistances, (which have been patented to myself and Walker Thomas Goolden in Great Britain, under No. 10,978 and date of June 6, 1894, upon an application in which I was stated to be the inventor,) of which the following is a specification.

This invention relates to instruments used for the direct indication of electric resistance, and has for its object the removal of certain difficulties which are met with in the use of known instruments for the same purpose. The difficulties referred to arise, first, from want of perfect mechanical balance in the needle system; secondly, from the tendency of any ordinary astatic needle system to become non-astatic in consequence of unequal demagnetization of the two needles, and, thirdly, from complete demagnetization of one or both needles of the astatic system when a large current is accidentally caused to traverse the current-coils of such an instrument in the wrong direction.

Figure 1:
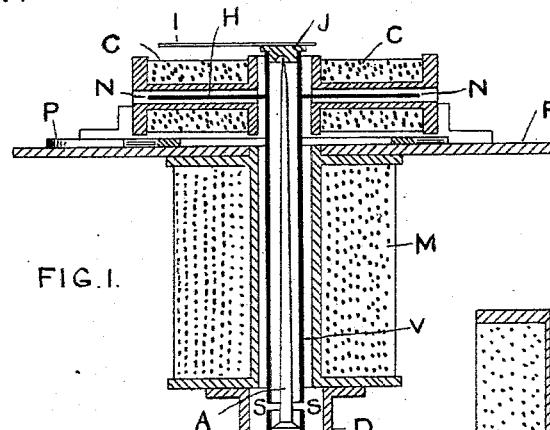
Figure 4:
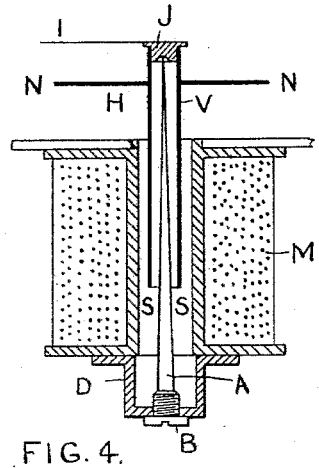
Figure 3:
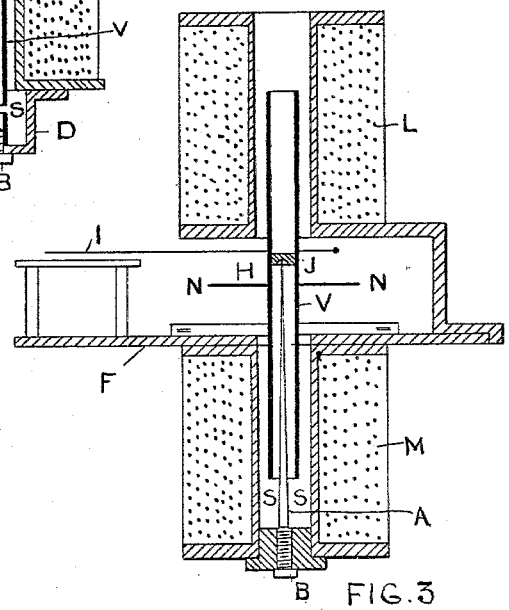
Figure 2:
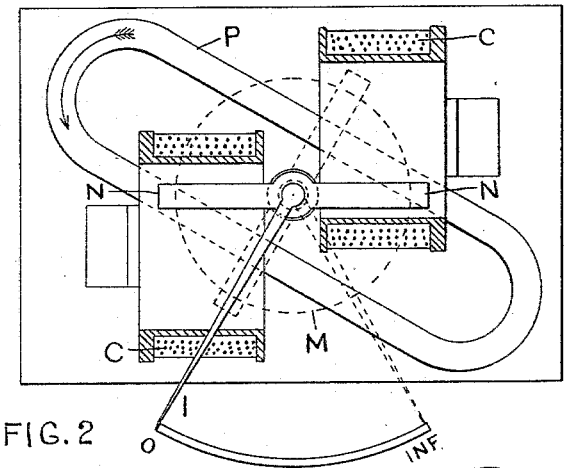
Figure 5:
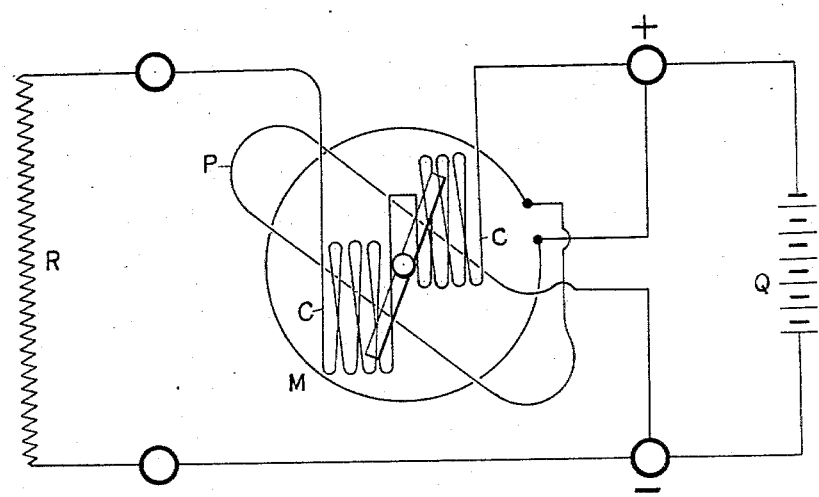

Figure 1 is a sectional elevation of my instrument. Fig. 2 is a plan of the same. Figs. 3 and 4 are sectional elevations of modified tubular needle supports and accessories. Fig. 5 is a diagrammatic view of the circuits connecting the various coils.

According to my present invention, the first difficulty is removed by suspending the needle system on a single point, as in a common compass, or by a nearly torsionless thread, as in many galvanometers; and the second and third difficulties are removed by making the needle system of soft iron in the form of a T, the vertical limb being conveniently in the form of a tube, while the horizontal limbs may be of uniform rectangular or other section. This form of needle system is shown in the drawings accompanying this specification.

V is a small tube of soft sheet-iron, forming the vertical portion of the aforesaid T, carrying a cup-jewel J at its upper extremity and freely supported on the fixed pin A, which has a fine steel or iridium point at the end on which the cup J rests. The horizontal limb H is made of a narrow strip of sheet-iron of uniform width and thickness and having a hole midway between its ends, in which the tube V is fitted and attached to H by soldering or otherwise. The pin A and vertical tube V lie in the magnetic axis of a coil M, and when a current traverses M the needle system becomes magnetized so that one pole, S S, is at the bottom of the iron tube, while the other pole, N N, is at the two ends of the iron strip H, and these ends, being thus of equal length and magnetized similarly and to the same degree, form an astatic combination, such that when placed in a uniform magnetic field they have no resultant turning movement about J as a center. The other pole, S S, of the system, being cylindrical and concentric with the axis on which the needle system turns, has of course no movement about that axis. Thus the whole system is astatic.

The pin A is attached to a screw B, which is threaded into the bracket D, fixed to the coil-bobbin. Unless some suitable precaution is taken, the tube V, being in unstable equilibrium, will be attracted toward the side of the coil M, and coming in contact with the pin A the free movement of the needle system will be hampered. One way of preventing this consists of fixing a short piece of iron tube K of the same diameter as V over the screw B and with its upper end a short distance below the end of V. The attraction between K and V is readily adjusted by sliding K up and down on B until V is just maintained in stable equilibrium in a vertical position. The iron tube K may, however, be dispensed with, and the needle system maintained in stable equilibrium, if the tube V is shortened so that its lower end is only a little more than half-way through the coil M, as shown in Fig. 4. A third way of maintaining stable equilibrium is by prolonging the tube V upward above the jewel J or point of suspension as shown in Fig. 3, and surrounding the prolongation with a fixed magnetizing-coil L, which serves to increase the strength of the poles N N, and at the same time by its upward attraction not only keeps the needle system stable, but reduces the pressure of the jewel on the supporting-point.

The current-coil of an ohmmeter made in accordance with my present invention is in two halves, as indicated in Fig. 2, which is a diagram in plan. Each half of the current-coil C C is wound on a flat bobbin, (shown in section in Figs. 1 and 2,) similar in shape to the coils of an ordinary detector-galvanometer. The infinity position of the needle must be such that the poles N N are well within the current-coils, and I find a total angular range of scale equal to sixty degrees of arc allows the needle to have its position for zero resistance parallel to the axes of the current-coils, and brings the position of the poles N N for infinite resistance well inside the current-coils.

The pressure-coil is most conveniently made in the form of a flat oblong, as indicated by P, Fig. 2. This coil only requires one or two hundred turns of fine wire, and can be made so thin that a place is easily found for it between the under side of the current-coils and the foundation-plate F of the instrument. The pressure-coil is arranged with its major axis at right angles to the needle N N when reading infinity, and the current in it must be in the same direction as the current flowing in the exciting-coil M. The needle N N will then rest at right angles to the major axis of the pressure-coil, when no current is traversing the current-coils C. In the figures the current in the exciting-coil M and pressure-coil P is supposed to be flowing contra-clockwise, as indicated by the arrow, so that the ends of the horizontal limb H of the soft iron T-needle become north poles.

An index-finger I, attached to the jewel-cap J, ranges over a scale divided to read in ohms or megohms.

The indications of an instrument made in accordance with my present invention will be independent of the direction in which the electromotive force is applied to the terminals of the instrument, so long as any extraneous magnetic forces tending to disturb the needle system produce a sensibly uniform field throughout the space occupied by the horizontal limb of the needle; and when the field produced by extraneous magnetic forces is not uniform, the reading will be in excess or in defect of the correct value for the resistance under test, according as the operating electromotive force is applied in one direction or the other, and in such case the mean of two readings taken with the electromotive force in opposite directions will give the true value of the resistance under test. Thus, whether the disturbing magnetic forces produce a uniform field or not, the instrument may be made to give correct indications by the simple expedient of reversing the applied electromotive force, and an ohmmeter made in accordance with my present invention may therefore be described as a reversible ohmmeter.

In order that the needle system may be clearly shown, it is shaded black where seen in section. In Fig. 2 the infinity positions of the needle N N and index I are indicated by dotted lines.

The dimensions of the various parts of an ohmmeter made as herein described may be varied very widely, but I find it generally convenient to make the needle N N about two inches in length.

In Fig. 5, to prevent confusion, the exciting coil or coils M and the pressure-coil P are shown by only one turn of wire.

Q is the battery or generator, and R is the circuit resistance under test.

The current-coils C C are in series in the direct circuit through the battery and resistance under test.

The pressure-coil P and the exciting-coils M are in series to one another, but are in a shunt-circuit from the main circuit through the resistance to be tested, so that when the resistance is O, the maximum current passes through the current-coils C, bringing needle as shown in the whole lines in Fig. 2, and when the resistance is infinite no current passes through the current-coils, but the whole current passes through the pressure and exciting coils P and M, bringing the needle to a position at right angles the major axis of the pressure-coil, and the pointer to infinity, as shown in dotted lines in Fig. 2.

Having now described my invention, what I claim, and desire to secure by Letters Patent, is—

1. In an instrument for the measurement of electric resistances, a cross-shaped magnetic needle system of soft iron, the lower vertical limb of which is adapted as a tube to receive an internal supporting-pin, in combination with surrounding exciting-coils, to form an astatic needle.

2. An instrument for the measurement of electric resistance, consisting of, in combination, a soft-iron horizontal needle, with soft-iron vertical tubular limb, a pin-pillar support within the vertical limb, exciting-coils about vertical limb; two current-coils about equal arms of horizontal needle; a pressure-coil adapted to frame of instrument, under and in proximity to the horizontal limb of astatic needle; and means for the maintenance of stable balance of the needle system, substantially as described.

In testimony whereof I have signed my name to this specification in the presence of two subscribing witnesses.

SYDNEY EVERSHED.

Witnesses:
ETHEL ANNA VIGNOLES-STREATLEY,
LEWIS GORDON LENOX, Jr.